Dec. 13, 1960  G. SAVARD ET AL  2,964,612
ELECTRIC ARC WELDING
Filed Aug. 20, 1957  2 Sheets-Sheet 1

Inventors
GUY SAVARD
CHARLES VOLFF
By *Ado Jacoby*
Attorney

Dec. 13, 1960    G. SAVARD ET AL    2,964,612
ELECTRIC ARC WELDING
Filed Aug. 20, 1957    2 Sheets-Sheet 2

Inventors
GUY SAVARD
CHARLES VOLFF
By
Attor

United States Patent Office 2,964,612
Patented Dec. 13, 1960

2,964,612

ELECTRIC ARC WELDING

Guy Savard, Vaudreuil, Quebec, Canada, and Charles Volff, Paris, France, assignors to L'Air Liquide, Societe Anonyme pour l'Etude et l'Exploitation des Procedes Georges Claude, Paris, France Filed Aug. 20, 1957, Ser. No. 679,264

Claims priority, application France May 29, 1957

15 Claims. (Cl. 219—146)

This invention relates to continuous high speed electric arc welding and to a continuous consumable electrode and to its manufacture.

Continuous welding processes of the type to which the present invention belongs are carried out by continuously feeding an electrode through a gun which contains the contact and striking and maintaining an arc continuously as long as required for a particular welding operation. This should not be confused with the type of welding where a consumable stick electrode is employed and held fixedly in an electrode holder and when used up has to be replaced. The operating conditions and the nature of the electrode are different and do not involve the same problems. For example, the current density used with a ¼" stick electrode at 400 amperes is 8000 amperes per square inch, whereas with the applicants' process, at the same amperage, the current density is incomparably higher.

The stick electrode has a relatively thick stiff body 14" to 18" long and capable of self-support over its whole length during the welding operation. It is only capable of self-support for a relatively short length at the most up to 6" or 8". The conventional stick electrode is coated with flux, or at least carries flux fixed to it in some manner, presenting no problem where the electrode is relatively thick and where electrical contact is made from a bare end. The electrode for continuous welding is thin and flexible and continuous for lengths of hundreds of feet.

Prior to the applicants' development the continuous electrode has been a bare-surfaced wire. Protection to the welding area has been accomplished by means separate from the electrode.

One way of doing this by a continuous method is to feed a wire electrode and to protect it by a flux powder fed in excess from a hopper. This has the disadvantage that the operator can only work in a flat position because the flux has to be fed by gravity. Besides, cumbersome apparatus is needed and the arc is screened by the flux so that the operator cannot see the work in process.

A further proposal for continuous welding has been to use a high density current and a bare wire electrode protected by an atmosphere of inert gas. This is too expensive to apply to most metals. The cost would be prohibitive, for example, for welding mild steel, or other base metals on which the bulk of welding is done. Moreover, even where it can be used, the inert gas has the sole function of screening and has no beneficial effect on the weld as has a slag.

APPLICANTS' DEVELOPMENT

The applicants have found it possible to carry out a process of continuous electric arc welding at high speed by a method which avoids the disadvantages of prior methods and provides positive advantages and may be used manually or automatically. The applicants' method involves striking an arc between the work and the end of a continuous uniform flexible carrier of welding metal, then continuously feeding the continuous carrier and a plurality of continuous uniform ribbons of flux carried by the carrier to the site of welding. The arc is maintained whereby welding metal is burned off the carrier to form a pool of molten metal at the site of welding and the flux is continuously deposited at the site and transformed into slag to stabilize the arc, to shield the pool of welding metal, and to give metallurgical properties to the weld. By the applicants' method the conditions of welding can remain substantially constant, in other words, the continuous arc can be maintained and the weld can be carried out continuously without interruptions.

In accordance with the invention, the feeding speed may be up to 150 inches per minutes and is usually above 80 inches per minute with from about 90 inches to about 130 preferred.

In accordance with the invention, the carrier is of weldable metal, preferably of weldable quality mild steel, stainless steel or of hard facing steel alloys. In the case of these preferred metals, the proportion of flux fed to the proportion of welding metal may range from about 8% to about 25% by weight, preferably from about 17% to about 22% by weight.

Preferably, this method is carried out by the use of a continuous electrode which is a part of the invention. This electrode is made up of from two to five carrier wires twisted together to form a continuous carrier of welding metal, providing continuous pockets therebetween for flux, and a continuous contact at the surface or lands of the wires. In accordance with the invention the wires can vary in diameter within the range from about .030 inch to about .080 inch.

In accordance with one form of the invention, the electrode is made up from two to three bare-surfaced wires of mild steel twisted together in a spiral without a core to form a flexible stranded wire carrier of welding metal. By the twisted construction, the wires provide spiral parallel lands intervened by spiral flutes. A continuous spiral ribbon of flux is carried within each flute while the tops of the lands remain bare. Each wire has a uniform diameter within the range from about .030 inch to about .080 inch, preferably from about .040 to about .050. The pitch of twist is within the range from about 1.5 to about 3 diameters of the total wire, preferably from about 1.8 to about 2.2 diameters, for the two or three wire electrode, that is to say a total range from about 3 to about 4½ turns to the inch.

The amount of flux is between about 8% and about 11% by weight of the metal of the electrode for the three wire and about 8 to 14%, and sometimes up to 16%, for the two-wire electrode. The flux is compacted into the flutes and adhesively bonded to the wire surface in a dense solid mass so as to become an integral part of the electrode. The flux adheres to the metal sufficiently to substantially entirely prevent its shedding during normal handling and welding. The flux is in the form of flexible ribbons which bend with the carrier. One way of preserving the flexibility of the flux is to dry it without baking, thus leaving it unbaked.

In another construction, the electrode is a four or five-wire electrode made up of a core wire and three or four parallel spaced apart carrier wires wrapped in a spiral around the core wire to form a continuous carrier of welding metal. By this construction, the wires provide a central core and three spaced-apart channels for flux intervened by the carrier wires which constitute the spiral flutes. A continuous spiral ribbon of flux is carried within each flute or pocket while the tops of the lands remain bare. Each wire has a uniform diameter within the range from about .030 to about .070 inch, preferably from about .040 to about .055 inch, and the size of the core wire diameter relative to the carrier wires is within the range of from about ¾:1 to about 2:1. That is to say, the cross-sectional area of each carrier wire is between 0.64 and 2.25 times the cross-sectional area of the core wire, preferably from 0.8 to 1.5 times that of the core wire. The core and carrier wires may, but need not be, compressed or swaged so that the total diameter of a circle touching the perimeter of the electrode is reduced by an amount within the range from about 3% to about 5%. This deforms the respective wires somewhat giving a "bed" at their points of contact. Whether there is any swaging or not the pocket or flux channel is fish-tailed in cross section and has an undercut adapted to retain the ribbon of flux contained in the pockets.

In the "four wire" electrode, the pitch of twist of the spiral carrier wires is within the range of about 1.2 to 2 diameters of the total wire, preferably from about 1.3 to about 1.6 diameters. That is to say, from about 4 to about 6½ turns to the inch. The amount of flux is within the range from about 15% to about 25%, preferably from about 17% to about 22%, by weight of the metal of the electrode. The flux is compacted into the flutes or pockets and thus mechanically held and is also adhesively bonded to the wire surface in a dense solid mass so as to become an integral part of the electrode. This flux is held within the pockets sufficiently to substantially entirely prevent shedding during normal handling and welding and, as in the case of the two and three-wire electrodes, can be bent about a diameter as small as four inches.

The wire is preformed before application of the flux. The wire may be made on a conventional twisting apparatus, but after the twisting operation care must be taken to make sure that the wire has a "dead lay." The wire can, if necessary for this purpose, be straightened after the twisting operation. Otherwise, the electrode does not feed evenly but "wobbles" from one side to the other, and an uneven arc results. Preferably the wire is not annealed, but "as drawn."

The flux is preferably a mineral flux of the rutile type. For the present invention, the flux is preferably made up in the form of a specially fine powder. The flux is preferably made into a paste and applied by extruding the wire and flux through a die having a close fit to the wire. This extrusion is at a relatively high pressure, for example from about 200 to about 650 pounds per square inch, with 450 to 550 preferred. The wire coming from the extrusion is preferably carried through a drying space at room temperature to dry the flux without making it brittle and is then wound on a spool.

The invention has generally been described and it will now be explained in more detail by reference to the accompanying drawings which illustrate preferred embodiments of it, and in which Figure 1 is a side elevation on an enlarged scale of a length of continuous two-wire welding electrode according to a preferred embodiment of the invention with the flux portion removed to show the diameter of the electrode.

Figure 1:
Figure 2:
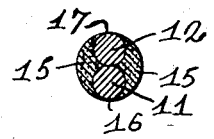
Figure 2 is a transverse cross-section through the electrode of Figure 1.
Figure 3:
Fig. 3 is a side elevation of a length of the electrode of Figure 1 on a closer to normal scale.
Figure 5:
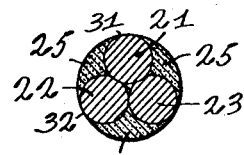
Figure 5 is a transverse cross-section through the electrode of Figure 4.

Referring more particularly to Figures 1 to 3, a two-wire electrode is shown made up of 2 wires 11 and 12 twisted together in a helix and a ribbon of flux 15 filling each helical pocket formed between the respective wires. The surface of the wires or lands 16 and 17 between the pockets constitute electrical contact surfaces which continuously contact the welding torch or electrode holder.

Figure 4:
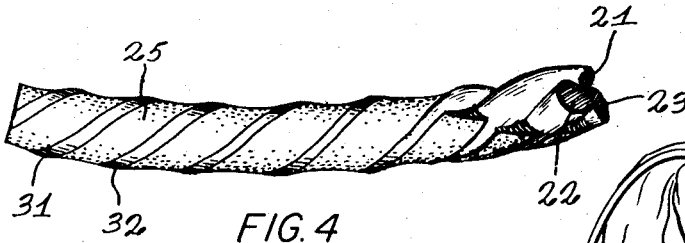
Figure 4 is an enlarged side elevation similar to Figure 1 of a three-wire electrode.

Figure 4 illustrates a three-wire electrode made up of wires 21, 22 and 23 with a ribbon of flux 25 in each interstice or pocket between the lands 31 and 32 of the respective wires. Pitch, as used in this application, means the distance between the "summit" of respective wires 11 and 12 along the peripheral surface of the electrode parallel to the axis. This is the distance $p$ illustrated on the drawings.

Figure 6:
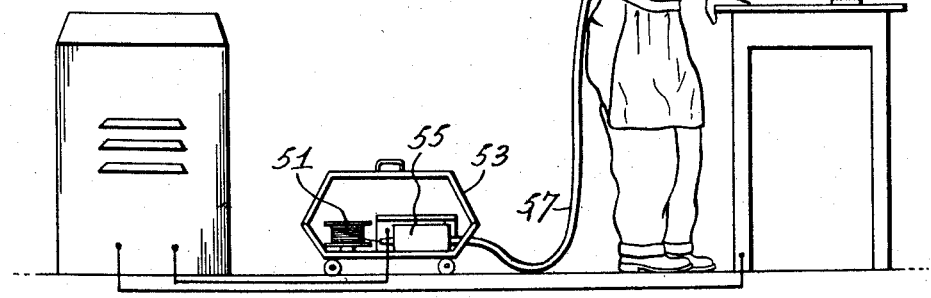
Figure 6 is a diagrammatical view showing a welder carrying on a welding operation with a continuous electrode according to the invention.
Figure 7:
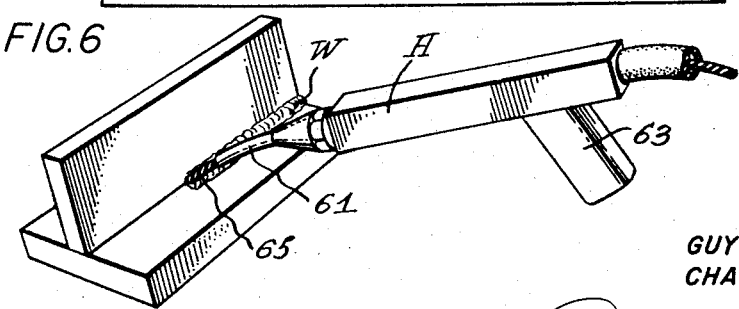
Figure 7 is a fragmentary perspective view to show a position of the welding torch in relation to the work in welding according to the invention.

A welding operation according to the invention is shown in Figures 6 and 7. The electrode is fed from the spool 51 through a feeding device 55 in a housing 53. The device 55 includes a pair of rollers (not shown) which engage the electrode and feed it forwardd. The electrode is fed through a flexible cable 57 to an electrode holder H. The feeding device may be similar to that shown in United States Patent 2,544,801, the disclosure of which is hereby incorporated by reference. The electrode holder is moved "forehand" as demonstrated in Figure 7 with the electrode holder moving forward in the direction of feeding of the electrode.

By proceeding in this way the welder can see what he is doing and he can increase his speed up to 50 percent and it is usual to operate at a speed greater than 25 percent more than possible with the "backhand" method of down-hand welding. For example, in welding a three-eighths inch plate he can proceed at a speed of from about 9 to about 15 inches a minute, whereas for a lighter plate of one quarter inch he can proceed at from about 15 to about 20 inches a minute while for a five-eighths inch plate he can proceed at about 8 to about 12 inches per minute. Thus from about 10 to about 25 pounds of electrode can be fed per hour (as compared to about 4 to about 10 pounds per hour for a stick electrode) with 17 pounds per hour a good working average.

Generally speaking, at least twice as much (weight per equivalent diameter per hour) of the continuous electrode of the invention is fed as compared to a stick electrode.

CARRIER OF ELECTRODE WIRE

The wire from which the electrode is made is weldable quality metal. Preferred metals are weldable quality stainless steel (as defined in the Handbook of the American Society for Metals, 1948 Edition), or of hard facing steel alloys. Hard facing steel alloys are those employed in the process of depositing alloys such as manganese steel and others which give an unusually hard surface on solidification. One example of the use of such alloys is in the facing of tractor blades to armor them against extreme wear and tear.

The wires may be twisted together by using a conventional twisting machine or they may be twisted together by hand using, for example, a twist drill to perform the twisting operation while feeding the wire from a stationary position. The wire must have a "dead lay" and this can be done by straightening it to eliminate undue twist or curvature. The dead lay is important so that the wire does not have "whip" and move around at the tip of the electrode holder during welding which is likely to break the arc or to cause an unsteady arc.

FLUX

The selection of a flux which will answer the requirements of an electrode of this nature is also important. This flux must be very dense in order to provide sufficient flux per unit of length of the electrode to give fluxing at the weld. The flux should have a density within the range from about 2.5 to about 3.5. At the same time, it must be sufficiently adhesive to adhere to the wire of the electrode without flaking off during manufacture, handling or welding. One type of flux which is suitable includes, as functional agents, rutile in an amount from about 15% to about 35%, a wetting mineral for decreasing the surface tension of the slag, a body-giving fibrous material, a lubricating agent, a gas-forming agent, a slag removal agent, a deoxidizing agent, and a binder within the range from about 19% to about 26% by weight of the functional agents.

Preferably, the primary slag-forming agents, which include the rutile and the wetting mineral, are present in an amount from about 40% to about 55%. Preferably, the wetting mineral is ilmenite. The fibrous body-giving material is present within the range from about 5% to about 15% and the preferred such agent is asbestos having a size 70% through 200 mesh, and 100% through 100 mesh. The lubricating material is present within the range from about 5% to about 20% and the preferred lubricating agents are finely divided lubricating powders, for example, talc and kaolin. The gas-forming agents are present in an amount within the range from about 5% to about 10%, and are preferably made up of a cellulose material, for example, wood powder and a dissociable mineral, for example, iron carbonate. The slag removal agent is present within the range from about 5% to about 15% and is preferably feldspar. The deoxidizing agent is present within the range from about 12% to about 22% and is preferably ferro-manganese. The binder is present within the range from about 19% to about 26% by dry weight of the functional constituents, and is preferably sodium silicate with about 5% of a glycerin. Preferably, this binder is 38% solids and has a ratio of $SiO_2$ to $Na_2O$ of 3:1.

The flux is prepared by first mixing intimately the dry functional ingredients in a suitable mixing machine. Then the binder is added and intimately mixed with the dry materials to form a paste having a water content from about 18% to about 24% by weight.

When the flux has been prepared in this manner, it is applied to the wire by passing the wire through an extruding apparatus in which the flux is forced, under pressure, on to the wire as the wire is passed through a die. The flux thus remains intimately deposited and compacted within the spiral flutes of the wire adhering to the surface of the wire. The electrode thus formed is led through an extensive drying area at normal room temperature so that the flux is allowed to set without baking, to form a dry solid compact mass which adheres to the surface of the wire, resisting forces tending to remove it, for example bending and abrasion. It should be explained that baking causes the flux to become hard and brittle in which condition it cracks and separates more easily from the carrier wire.

The amount of flux on the wire is relatively critical. At any less than the amounts specified, there is insufficient flux to maintain adequate slag coverage, proper arc stability and good weld appearance, and at any more there is a tendency to make poor contact between the electrode and the contact tube of the welding gun.

As between two and three wire electrodes for welding currents from about 270 up to about 375 amperes a two-wire electrode is preferred. For currents from about 325 to about 500 amperes, a three-wire electrode is preferred. The practical range of welding current is from about 250 to about 500 amperes.

The choice of mineral constituents is also made up to obtain proper arc stabilization under various electrical conditions. The fluxing material enables the process to work with D.C. or A.C. power supply and the electrode polarity can be made negative or positive to suit different welding conditions.

ALTERNATIVE FORM OF THE INVENTION

Figure 8:
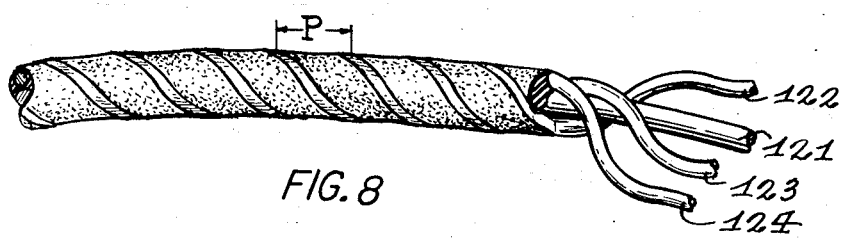
Figure 8 is a side elevation on an enlarged scale of an alternative preferred form of an electrode according to the invention with portions of the flux ribbons partly removed to show the construction of the carrier.
Figure 9:
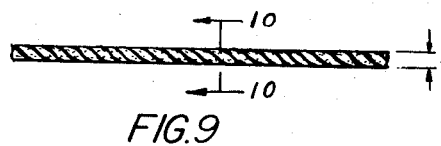
Figure 9 is a side elevation of the length of the electrode of Figure 8 on substantially normal scale.
Figure 10:
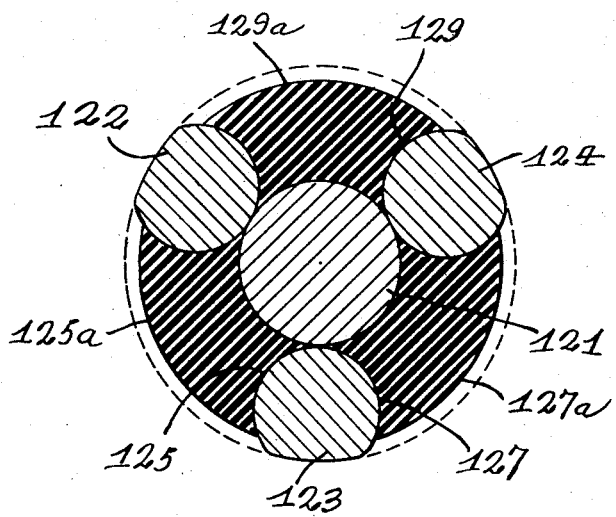
Figure 10 is a transverse cross-section on a much larger scale through the electrode of Figures 8 and 9.

Referring more particularly to Figures 8 to 10, the "four-wire" electrode is shown made up of a core wire 121 and carrier wires 122, 123, and 124. As best indicated in Figure 10, the core wires are spaced apart and form therebetween helical packets 125, 127 and 129. A ribbon of flux 125a fills the pocket 125, 127a fills the pocket 127, and 129a fills the pocket 129 as shown. Since the bottom part of the pockets is substantially fish tailed in cross-section, the ribbons 125, 127a and 129a project beneath the respective carrier wires and into the bites between these cores and the core wire and are held in place in that manner. Also, the pockets are relatively spacious. The surfaces of the wires or lands, which project beyond the flux ribbons constitute electrical contact surfaces which continuously contact the welding torch or electrode holder.

The welding operation is similar to that explained in connection with Figures 6 and 7. Forehand welding is possible with its attendant advantages. Moreover, the result of using the particular form of electrode shown in Figures 8 to 10 is better than both shown in Figures 1 to 5. An electrode of this particular preferred form enables more flux to be fed and at the same time more metal with electrodes of similar flexibility.

Generally speaking, the electrodes of the present invention are considerably more flexible than stick electrodes, as they have to be for feeding through an electrode holder. The stick electrode is generally from 1/8" to 5/16" in diameter, and from 14" to 18" long. It is made up of a core coated with flux to the extent of about 15% by weight. The stick electrode is rigid so that it can be used without support and held at one end by the electrode holder. The continuous electrode of the present invention, on the other hand, is generally within the range from about 1/32" to about 3/16" in diameter and usually on the low side of the range, although the invention is applicable to larger sizes. So the continuous electrode of the invention is generally flexible as compared with the stick electrode, both because of its smaller diameter and because of its twisted wire construction. It is flexible both because of the relatively small diameter and because of its twisted wire construction. It is only self-supporting to the extent of from 6" to 8" of its length, and longer lengths have to be supported or will bend under pressure unless supported. Therefore, the continuous electrode is fed from an electrode holder with only up to about 3" protruding at any one time.

The four-wire electrode of the invention is to be preferred. It is more flexible for a given weight than the two or three-wire electrode. It can carry more flux. The shape of the pockets or channels in which the flux is deposited help to secure the flux to the carrier. In addition, the four-wire type is more symmetrical and thus provides for smoother welding. The four-wire electrode gives better arc stability, less spatter and better physical properties in the weld. An X-ray quality weld can be achieved.

The current density employed in the present type of continuous welding is from about 65,000 amperes per square inch to about 105,000 amperes per square inch. This is incomparably higher than in non-continuous or "stick" electrode welding.

The action of the present electrode in welding appears to be as follows.

The outer or carrier wires are to some extent electrically insulated from each other by the flux. This keeps the flow of current from one wire to another substantially below the flow necessary for sustaining an arc. Said outer wires have, with the core wire, sufficiently little electrical contact to cause the welding arc to be transferred in rapid succession from one wire to another as the wires melt. This being the case, the wires are periodically subjected to a high current density and are melted spray-wise. The core wire preferably has a thin insulating coating, e.g., the thin oxide coating of the kind usually found on metal wires after drawing.

Sometimes the overall cross section of the wires is reduced, for example by swaging, to a certain extent so that the electrode offers a maximum area for electrical contact with a contact tube in a welding gun. The flux is usually confined within a circle smaller than a circle circumscribed about the strand of wires.

The construction of the present invention unexpectedly permits a relatively small diameter electrode to have sufficient flux ratio (to welding metal) to allow for a high feeding speed as defined herein, which in turn permits a high current density, which is necessary for high arc stability.

In order to get enough flux on the electrode, there has to be a proper ratio in the size of the carrier wires to the core and the number of wires must be low enough to give space for flux and, in addition, the pitch must be great enough. Further, the wires must be twisted into firm nesting relationship so that there is no slipping which would tend to dislodge the flux and also would unstabilize the arc. So there are several features in the construction of the electrode that contribute toward the results achieved in welding according to the teachings of the present invention.

The amount of flux in terms of volume may be up to about 50% for the two-wire and four-wire electrode and up to about 30% for the three-wire electrode. Generally speaking, the more wires the less flux which can be attached. However, with the four-wire electrode as an exception, owing to its cored construction, it is also possible to make a five-wire electrode with a core and four carrier wires. Such an electrode would have the same quantitative characteristics as the four-wire electrode.

Example I

WELDING OPERATION

A typical welding operation was carried out as follows.

The welding operation was fillet welding on the assembly of a mild steel turntable for a crane 15" in diameter, one half inch box sections.

APPARATUS USED

The apparatus used was a continuous wire feeding apparatus, along the lines of that shown in United States Patent 2,544,801, but with no facilities for gas shielding. The reference to the U.S. patent is merely made to simplify the understanding of the type of apparatus used.

There was employed a continuous electrode as defined herein and having the following specific characteristics.

| | |
|---|---|
| No. of wires | 3. |
| Size of wires | .045" in diameter. |
| Shape | Circular in cross-section. |
| Pitch | 1.85 times diameter of total wire. |
| Lay | Dead. |

PROCESS

The welder struck an arc with a current of 330 amperes at 30 volts and with a terminal length of 1" and 1½". The welder maintained the arc at these conditions for two and one half minutes while welding "forehand" with the tip of the torch inclined diagonally to the work. The wire was continuously fed at a rate of from about 90 to 100 inches per minute which amounted to about 14 pounds per hour. The rate of welding was 15" per minute. The burn-off was such as to maintain the terminal length substantially constant within the range from about 1" to 3", preferably within the range from about ¼" to 1½". The electrode was fed constantly into the welding pool with substantially no whip thereby maintaining the arc steady without interruption. The welding took place in a normal atmosphere of air with no auxiliary gas shielding.

The resulting weld in appearance and quality was at least equal to that obtained by conventional flux-coated non-continuous electrode welding.

The electrode was wound on a spool containing 20 lbs. (about 700') and was fed from this spool to the electrode holder.

Example II

MANUFACTURE OF ELECTRODE

An electrode having the wire characteristics as described in Example I was made as follows:

The wires were twisted together on a stranding machine. The resulting cable was then straightened to make sure that it had a dead lay. Either operation could, however, be carried out in making small quantities of twisted wire by the use of hand tools. The cable can be "as drawn" i.e. not annealed where care is taken in twisting it, and this represents a saving in cost.

Then on an extruding machine a rutile flux having the following characteristics was extruded onto the wire, in a paste form.

| Material: | Percent by weight |
|---|---|
| Ferro manganese | 16.5 |
| Rutile | 32.5 |
| Talc | 4.5 |
| Asbestos | 4.5 |
| Kaolin | 9.5 |
| Sodium carbonate | 4.1 |
| Cellulose | 12.3 |
| Silicate | 16.1 |

These materials were thoroughly mixed to form a homogeneous mixture which was formed into a paste with about 12% of moisture by weight. This paste was put into an extruding machine and the wire was run through the extruding machine with a die closely fitting the wire so that there was extruded on to the wire approximately 9% by weight of the flux.

The wire was passed from the extruding machine about a number of pulleys so that it was exposed to the atmosphere for about three or four minutes and then was wound on to a spool.

The flux was compacted into the flutes and adhesively bonded to the wire surface in a dense solid mass. The flux adhered to the metal sufficiently to prevent its shedding during normal handling and welding. The wire could be bent about a three inch radius without causing the flux to flake off. The surface of the lands presented by the tops of the wires projected beyond the flux so as to give a continuous smooth metal surface for electrical contact with the electrode holder.

FEEDING SPEED

According to the invention, the electrode is fed at a speed within the range from about 100 to about 150 inches per minute. The voltage employed is from 28 to 35 volts. The amperage is partly a function of wire diameter. The following ranges of amperage are recommended.

| Wire Diameter | Amperage | |
|---|---|---|
| | For Downhand Welding | For Vertical Position Welding |
| | Amperes | Amperes |
| .045 | 200 to 250 | 125 to 150 |
| .050 | 230 to 275 | |
| .060 | 260 to 340 | |
| .070 | 325 to 400 | |

MANIPULATION

A great advantage of the present invention is high welding speed. The type of manipulation employed by the welder is a downhand method. Normally however, with for example using a stick electrode, the welder has to proceed "backhand." However, according to the present method he can proceed "forehand." The inclination of the torch is shown in Figure 7.

*Example III*

A welding operation was carried out similar to Example I except that the electrode is of the "four-wire" type shown in Figures 8 to 10. The wires were all circular .045" diameter. The pitch was 6 turns to the inch (1.85 diameters). The wire had a dead lay. The electrode was wound on a spool containing 30 lbs. (about 1050 feet).

The welding operation was carried out as described in Example I with excellent results.

The electrode was fed at a speed of 100 to 110 inches per minute. The voltage was 30 volts.

The following ranges of amperage were found to be effective for downhand welding the particular diameters given, amperage being partly a function of wire diameter.

| Wire diameter: | Amperage |
|---|---|
| 4 wires of .040" | 200 to 250 |
| 4 wires of .045" | 280 to 320 |
| 4 wires of .050" | 320 to 400 |

An electrode of the present invention has the following advantages.

(1) No accessories are necessary as, for example, with inert gas welding or with a flux that is separately fed. With both these types of welding, special accessories must be employed to feed the gas or the flux as the case may be.

(2) The use of the present electrode makes possible "position" welding. That is to say, the welding does not have to be accomplished on the horizontal. So, in this respect it can be used under conditions where inert gas or better flux welding cannot be employed.

This application is a continuation-in-part of application Serial No. 640,882, filed February 18, 1957, now Patent No. 2,849,593, dated August 26, 1958, which in turn is a continuation-in-part of application Serial No. 356,208, filed May 20, 1953, now abandoned.

We claim:

1. A continuous consumable electrode for electric arc welding comprising at least two and not more than five flexible, bare-surfaced wires of a weldable quality metal twisted together spirally to form a metal carrier having a longitudinally continuous flexible body, the space defined by the adjoining surfaces of the respective wires constituting continuous pockets, a continuous ribbon of flux in each pocket, the lands of the wires projecting beyond the ribbons of flux and constituting continuous electrical contacts, the flux ribbons being effectively held to the surface of the wires to remain in place during normal handling and welding and being sufficiently flexible to bend with the wires, the wires having a uniform diameter within the range from about .030 inch to about .080 inch, the amount of flux being within the range from about 12% to about 25% by weight of the metal carrier, the pitch of twist of the wires being within the range from about 1.2 diameters to about 3 diameters of the total wire, the carrier having a substantially dead lay, the electrode being capable of being bent about a diameter as low as about four inches without breaking off the flux.

2. A continuous consumable electrode as defined in claim 1 having from two to three wires and in which the proportion of flux to welding metal is within the range from about 8% to about 16% by weight, the wires having a diameter within the range from about .030 inch to about .080 inch, the pitch of twist being within the range from about 1.2 to about 3 diameters of the total wire.

3. A continuous consumable electrode as defined in claim 1 having a core wire and three carrier wires spirally wound about the core wire, each wire having a uniform diameter within the range from about .030 to about .070 inch, the core wire diameter relative to the carrier wire diameter being within the range from about ¾:1 to about 2:1, the amount of flux being within the range from about 15% to about 25% by weight of the metal carrier, the pitch of twist of the spirally wound carrier wires being within the range from about 1.2 to about 2 diameters of the total wire.

4. A continuous consumable electrode as defined in claim 3 in which the component wires are compressed in such a manner that the effective total diameter of the carrier is reduced by an amount within the range from about 3% to about 5% over what it would be were the wires not so reduced.

5. A continuous consumable electrode comprising a core wire and three carrier wires spirally wound about the core wire to form a metal carrier having a longitudinally continuous body, the space defined by the adjoining surfaces of respective wires constituting continuous pockets, the pockets having an inner portion of substantially fish-tailed shape in cross-section, a continuous ribbon of flux in each pocket having a portion with a fish-tailed conformation corresponding to that of the carrier, whereby the ribbon is wedged beneath the carrier wires, the lands of the carrier wires projecting beyond the ribbons of flux to constitute continuous electrical contacts, the flux ribbons being effectively held to the surface of the wires and being mechanically wedged as aforesaid, thereby to remain in place during normal handling and welding.

6. A method of continuous electric arc welding which comprises feeding a continuous welding metal carrier having a cross-sectional area within the range from about .060 to about .350 square inch, and simultaneously feeding continuous ribbons of flux in direct contact with the carrier and supported thereby in an amount from about 8% to about 25% by weight of the metal of the carrier, the flux being deposited to form a protective slag and the welding metal entering into weldable relationship with the work whereby a weld is formed, the feeding speed of the electrode being within the range from about 80 inches to about 150 inches per minute and the welding current being within the range from about 250 to about 500 amperes.

7. A method as defined in claim 6 in which the welding is performed forehand.

8. A method of continuous electric arc welding comprising feeding a continuous flexible welding metal carrier having a cross-sectional area within the range from about .060 to about .350 square inch, and simultaneously feeding continuous ribbons of flux in direct contact with the carrier and supported thereby in an amount from about 8 to about 25% by weight of the metal of the carrier, the feeding speed of the carrier and flux ribbons being within the range from about 80 inches to about 150 inches per minute and the current density being within the range from about 65,000 amperes per square inch to about 105,000 amperes per square inch of cross-sectional area of the carrier.

9. A continuous consumable electrode comprising a core wire and from three to four carrier wires spirally wound about the core wire to form a metal carrier having a longitudinally continuous body, the space defined by the adjoining surfaces of respective wires constituting continuous pockets, the pockets having an inner portion of substantially fish-tailed conformation cross section complementary to that of the carrier, whereby parts of the flux ribbon are retained beneath the carrier wires, the lands of the carrier wires intervening the ribbons of flux to constitute continuous electrical contacts, the flux ribbons being effectively held to the surface of the wires and being mechanically retained as aforesaid, thereby to remain in place during normal handling and welding.

10. A continuous electrode for electric arc welding comprising from two to three bare-surfaced circular cross-section wires of a weldable quality metal selected from the group consisting of mild steel, stainless steel and hard facing steel alloys, said wires being twisted together in a spiral and forming a continuous flexible stranded wire carrier of welding metal having a substantially dead lay, the wires of said carrier forming lands and intervening spiral flutes, a continuous ribbon of flux substantially filling each flute between the lands, the lands presenting a continuous bare top portion constituting continuous electrical contacts, each of said wires having a uniform diameter within the range from about .040 inch to about .080 inch, the pitch of twist being from about 3 to about 4½ turns to the inch, the amount of flux being an amount effective to provide a protective slag at high welding speed between about 8% and about 16% by weight of the electrode, the flux being an unbaked mineral flux having a density within the range from about 2.5 to about 3.5, the flux being compacted into the flutes and adhesively bonded to the wires in a continuous solid mass adhering to the metal to prevent it shedding during normal handling and welding.

11. A continuous electrode as defined in claim 10 in which there are two wires.

12. A continuous electrode as defined in claim 10 in which there are three wires.

13. A continuous electrode according to claim 10 in which the flux is of a rutile type having primary slag-forming materials present in an amount of from about 45% to about 55% by weight of the flux and including rutile in an amount of about 20% to about 35% by weight of the flux.

14. A continuous consumable electrode comprising a core wire and from three to four carrier wires spirally wound about the core wire to form a metal carrier having a longitudinally continuous body, the space defined by the adjoining surfaces of respective wires constituting continuous pockets, the pockets having an inner portion of substantially fish-tailed conformation cross section complementary to that of the carrier, whereby parts of the flux ribbon are retained beneath the carrier wires, the lands of the carrier wires intervening the ribbons of flux to constitute continuous electrical contacts, the flux ribbons being effectively held to the surface of the wires and being mechanically retained as aforesaid thereby to remain in place during normal handling and welding.

15. A continuous consumable electrode as defined in claim 14 which contains about 50% by volume of flux.

References Cited in the file of this patent

UNITED STATES PATENTS

| | | |
|---|---|---|
| 1,312,254 | Jones | Aug. 5, 1919 |
| 1,361,269 | Mattice | Dec. 7, 1920 |
| 1,374,711 | Armor | Apr. 12, 1921 |
| 1,441,685 | Jones | Jan. 9, 1923 |
| 2,432,048 | Stretton | Dec. 2, 1947 |
| 2,490,179 | Willigen | Dec. 6, 1949 |
| 2,504,868 | Muller et al. | Apr. 18, 1950 |
| 2,683,207 | Lewis et al. | July 6, 1954 |
| 2,806,128 | Muller | Sept. 10, 1957 |